United States Patent
Peichl et al.

(10) Patent No.: US 9,042,274 B2
(45) Date of Patent: May 26, 2015

(54) SERIAL PERIPHERAL INTERFACE HAVING A REDUCED NUMBER OF CONNECTING LINES

(75) Inventors: Thomas Peichl, Wöstadt (DE); Thorsten Ehrenberg, Bad Nauheim (DE); Jörn Schriefer, Griesheim (DE)

(73) Assignee: Continental Teves AG & Co. oHG (DE)

( * ) Notice: Subject to any disclaimer, the term of this patent is extended or adjusted under 35 U.S.C. 154(b) by 911 days.

(21) Appl. No.: 12/994,510

(22) PCT Filed: May 29, 2009

(86) PCT No.: PCT/EP2009/056650
§ 371 (c)(1),
(2), (4) Date: Jan. 24, 2011

(87) PCT Pub. No.: WO2009/144308
PCT Pub. Date: Dec. 3, 2009

(65) Prior Publication Data
US 2011/0122978 A1    May 26, 2011

(30) Foreign Application Priority Data

May 30, 2008 (DE) .................. 10 2008 026 076
Nov. 21, 2008 (DE) .................. 10 2008 058 554
Nov. 21, 2008 (DE) .................. 10 2008 058 555
Dec. 23, 2008 (DE) .................. 10 2008 062 865

(51) Int. Cl.
*H04L 12/16* (2006.01)
*H04L 12/403* (2006.01)
(Continued)

(52) U.S. Cl.
CPC ............ *H04L 12/403* (2013.01); *H04L 7/0025* (2013.01); *H04L 1/1671* (2013.01); *H04L 12/40052* (2013.01); *H04L 7/044* (2013.01); *H04L 7/0008* (2013.01); *H04L 12/40006* (2013.01); *H04L 25/38* (2013.01)

(58) Field of Classification Search
CPC . H04L 12/40052; H04L 7/044; H04L 1/1685; H04L 5/1423
USPC .......... 370/350, 365, 267, 366, 395.62, 395.7
See application file for complete search history.

(56) References Cited

U.S. PATENT DOCUMENTS 4,689,740 A * 8/1987 Moelands et al. ............ 713/600
4,694,472 A * 9/1987 Torok et al. .................... 375/354
(Continued)

FOREIGN PATENT DOCUMENTS

DE    19702270 A1    9/1998
DE    10147442       4/2003
(Continued)

*Primary Examiner* — Ricky Ngo
*Assistant Examiner* — Dewanda Samuel
(74) *Attorney, Agent, or Firm* — RatnerPrestia

(57) ABSTRACT

An electronic communication system including at least one first communication unit and one second communication unit which are connected to one another by means of at least one first data line. The communication system has a data transmission protocol according to which, in at least one first data transmission mode for synchronized data transmission, the first communication unit transmits a data request signal or a clock signal to the second communication unit via the first data line at least once and the second communication unit transmits a data signal to the first communication unit via the first data line in response to the data request signal or the clock signal.

36 Claims, 15 Drawing Sheets

(51) Int. Cl.
*H04L 7/00* (2006.01)
*H04L 1/16* (2006.01)
*H04L 12/40* (2006.01)
*H04L 7/04* (2006.01)
*H04L 25/38* (2006.01)

(56) References Cited

U.S. PATENT DOCUMENTS

| | | | | |
|---|---|---|---|---|
| 4,847,867 A * | 7/1989 | Nasu et al. | ............... | 375/257 |
| 5,023,778 A * | 6/1991 | Simon et al. | ............... | 709/209 |
| 5,367,534 A * | 11/1994 | Chou et al. | ............... | 375/222 |
| 5,506,965 A * | 4/1996 | Naoe | ............... | 709/209 |
| 5,559,502 A * | 9/1996 | Schutte | ............... | 340/9.1 |
| 5,710,890 A * | 1/1998 | Hermer | ............... | 710/106 |
| 5,758,073 A * | 5/1998 | Liang et al. | ............... | 709/230 |
| 6,353,908 B1 * | 3/2002 | Heinrich | ............... | 714/748 |
| 6,467,065 B1 * | 10/2002 | Mendez et al. | ............... | 714/800 |
| 6,496,487 B2 * | 12/2002 | Franz et al. | ............... | 370/276 |
| 6,510,484 B1 * | 1/2003 | Kim et al. | ............... | 710/314 |
| 6,922,443 B1 * | 7/2005 | Kusumoto et al. | ............... | 375/259 |
| 6,990,540 B2 * | 1/2006 | Dalakuras et al. | ............... | 710/110 |
| 7,106,793 B2 * | 9/2006 | Spichale | ............... | 375/238 |
| 7,139,613 B2 | 11/2006 | Reinke et al. | | |
| 7,263,635 B2 | 8/2007 | Hentsch | | |
| 7,366,815 B2 | 4/2008 | Kadowaki | | |
| 7,406,100 B2 * | 7/2008 | Rocas et al. | ............... | 370/503 |
| 7,519,005 B2 | 4/2009 | Hejdeman et al. | | |
| 7,623,552 B2 * | 11/2009 | Jordan et al. | ............... | 370/503 |
| 7,721,030 B2 * | 5/2010 | Fuehrer et al. | ............... | 710/105 |
| 7,836,233 B2 * | 11/2010 | Tsunedomi et al. | ............... | 710/110 |
| 8,086,761 B2 * | 12/2011 | Huang et al. | ............... | 710/10 |
| 8,661,171 B1 * | 2/2014 | Krishnan et al. | ............... | 710/100 |
| 8,775,707 B2 * | 7/2014 | Poulsen | ............... | 710/110 |
| 2002/0083232 A1 * | 6/2002 | Dute et al. | ............... | 710/31 |
| 2004/0208200 A1 * | 10/2004 | Hejdeman et al. | ............... | 370/476 |
| 2005/0132137 A1 * | 6/2005 | Toombs et al. | ............... | 711/115 |
| 2006/0239104 A1 * | 10/2006 | Lee et al. | ............... | 365/230.01 |
| 2007/0019966 A1 * | 1/2007 | Chiu et al. | ............... | 398/155 |
| 2007/0033312 A1 | 2/2007 | Flandre et al. | | |
| 2008/0005434 A1 * | 1/2008 | Lee et al. | ............... | 710/110 |
| 2008/0075128 A1 | 3/2008 | Fourcand | | |
| 2008/0183929 A1 | 7/2008 | Gottswinter | | |
| 2009/0190571 A1 | 7/2009 | Kitz et al. | | |
| 2009/0193165 A1 * | 7/2009 | Hsieh et al. | ............... | 710/110 |

FOREIGN PATENT DOCUMENTS

| | | |
|---|---|---|
| DE | 10329707 A1 | 2/2005 |
| DE | 10 2005 014783 A1 | 10/2006 |
| DE | 10 2007 053667 | 5/2009 |
| WO | WO 2006044140 A2 | 4/2006 |
| WO | WO 2007144412 A1 | 12/2007 |

* cited by examiner

Fig. 5 a)

| OPSI data | 0 | 1 |
|---|---|---|
| SIMO data | \| 0 \| 1 \| | \| 0 \| 0 \| |
| OPSI bit coding | ⎵⎴⎵ | ⎵⎵⎵ |
| SIMO data | \| 1 \| 0 \| | \| 1 \| 1 \| |
| OPSI bit coding | ⎴⎵⎴ | ⎴⎴⎴ | b)

| OSPI data | 0 | 1 |
|---|---|---|
| SIMO data "serial-peripheral-interface" OSPI signal | \| L \| H \| | \| L \| L \| |
| SIMO data OPSI signal | \| H \| L \| | \| H \| H \| |

Fig. 14
a)
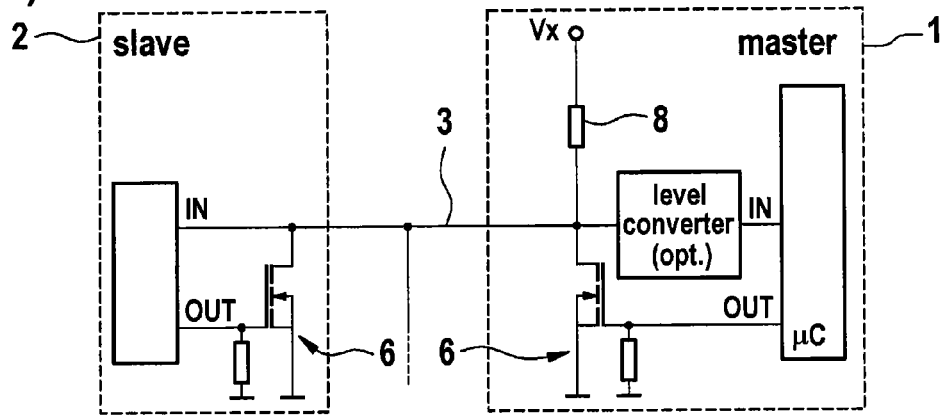
b)
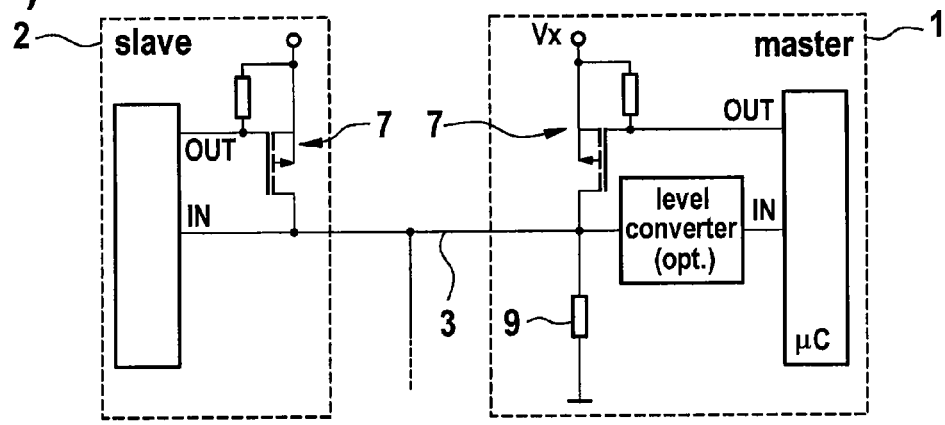
c)
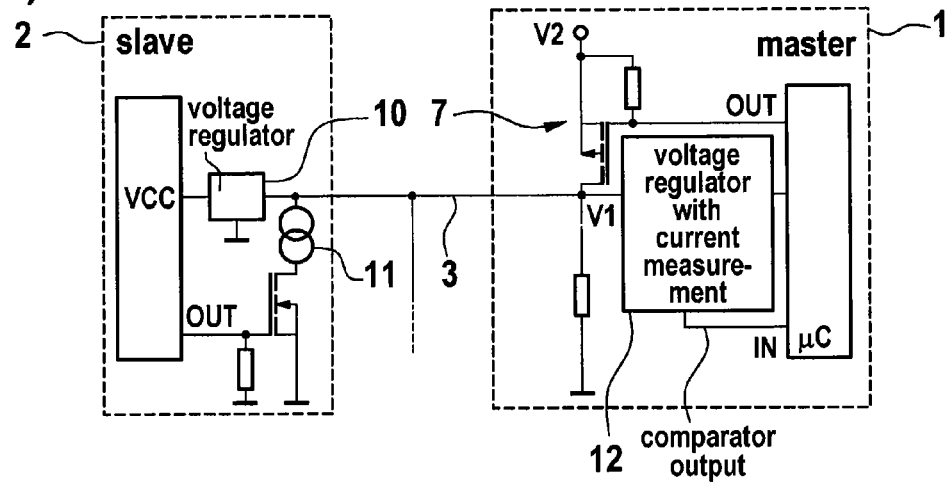

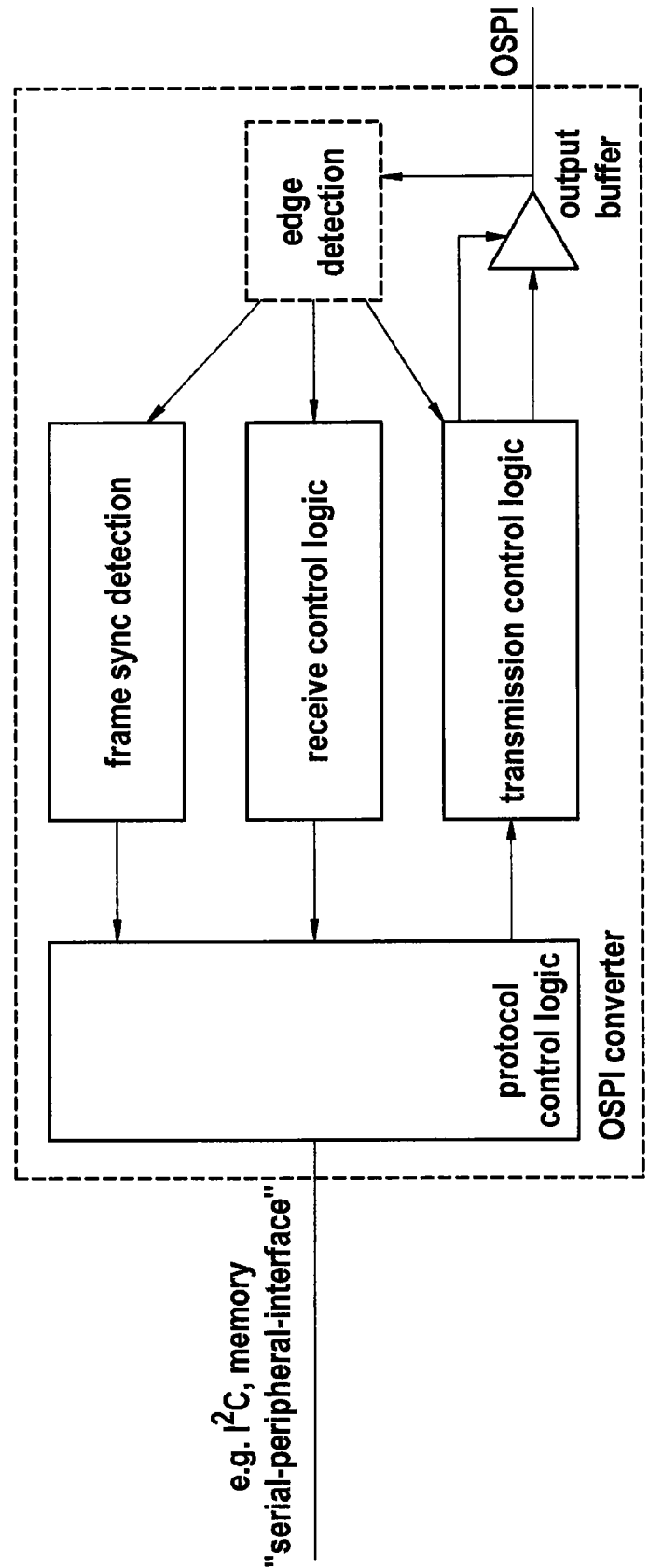

SERIAL PERIPHERAL INTERFACE HAVING A REDUCED NUMBER OF CONNECTING LINES

CROSS REFERENCE TO RELATED APPLICATIONS

This application is the U.S. national phase application of PCT International Phase Application No. PCT/EP2009/056650, filed May 29, 2009, which claims priority to German Patent Application No. 10 2008 026 076.2, filed May 30, 2008, German Patent Application No. 10 2008 058 554.8, filed Nov. 21, 2008, German Patent Application No. 10 2008 058 555.6, filed Nov. 21, 2008, and German Patent Application No. 10 2008 062 865.4, filed Dec. 23, 2008, the contents of such applications being incorporated by reference herein.

FIELD OF THE INVENTION

The invention relates to an electronic communication system and a method for data transmission between at least one first communication unit and at least one second communication unit and to the use of the communication system in motor vehicles.

BACKGROUND OF THE INVENTION

The name "serial peripheral interface" is used for a known serial data bus standard which permits bidirectional, synchronous and serial data transmission between a master unit and various slave units. In this context, however, an appropriate communication system comprises at least three lines between the master unit and a first slave unit for bidirectional data transmission, namely two data lines and one clock line. If there are a plurality of slave units, each of these units requires an additional select line to the master unit.

SUMMARY OF THE INVENTION

An object of at least one aspect of the invention is to propose a communication system and a method for data transmission which is relatively inexpensive and/or can be implemented with relatively few connecting lines.

The invention achieves at least one objective by means of the electronic communication system and method described herein.

The first communication unit and at least the second communication unit are preferably connected to one another by means of the first data line as a sole data line.

The relatively small number of lines, such as data lines, or in some cases a sole data line, on the basis of the data transmission protocol according to aspects of the invention allows significant cost savings in comparison with communication systems having a plurality of data lines.

Transmission of a data signal and/or of another signal via a line, for instance via the first data line, is preferably understood to mean sending of the signal via the line and/or application of the signal to the line.

A clock signal is preferably understood to mean a clock signal and a clock generator unit is preferably understood to mean a clock or clock unit.

The data transmission protocol is preferably in a form such that the data signal from the second communication unit comprises a defined number of bits, such as precisely one bit, for the first data transmission mode.

It is preferred for the data transmission protocol to be in a form for the first data transmission mode such that a message, which comprises at least one defined, separately interpretable information item, from the second communication unit to the first communication unit comprises a plurality of data signals. This message may comprise precisely one information item.

By way of example, a message is understood to mean an encoded value of a physical variable detected by a sensor element or an operating parameter for a sensor or actuator.

The data transmission protocol is preferably in a form at least for the first data transmission mode such that the clock signal from the first communication unit and the data signal from the second communication unit are transmitted essentially simultaneously via the first data line.

The first communication unit and at least the second communication unit may be connected to one another by means of an additional ground line or a reference-ground potential line and/or by means of an additional power supply line. The first data line may moreover additionally also be used as a power supply line, which is subsequently called a two-wire interface.

It is preferred for the data transmission protocol to be in a form at least for the first data transmission mode such that the data signal as output signal from the second communication unit and the clock signal or the data request signal from the first communication unit are overlaid on the first data line or that the data signal from the second communication unit overdrives the clock signal or the data request signal from the first communication unit on the first data line, wherein the data signal determines particularly the signal value on the first data line.

Preferably, at least the second communication unit does not have a clock generator unit of its own or it has a clock generator unit which does not operate in sync with a clock generator unit of the first communication unit and/or which, in comparison with the clock generator unit of the first communication unit, has lower clock precision or greater clock fluctuations.

The second communication unit is preferably in a form such that its response time for the data request signal or the clock signal from the first communication unit is within a defined time interval which is smaller or shorter than the period duration or a multiple of the period duration of the clock signal from the first communication unit and/or of the clock from the clock generator unit of the first communication unit. At least the second communication unit or a first slave unit may be in a form such that it has a guaranteed response time for at least one defined signal from the first communication unit and as a result has real-time capability.

The first communication unit preferably has a data output or data output connection which is directly or indirectly connected to the first data line, wherein the clock signal or data request signal from the first communication unit is provided or applied at this data output or data output connection.

The communication system is preferably in the form of a modified serial peripheral interface communication system with a reduced number of lines, for example with precisely one information transmission line, wherein at least the first communication unit and/or at least the second communication unit are essentially designed in compliance with a serial peripheral interface standard. In this regard, the first communication unit may have at least one data connection and a clock connection which are operated in clock sync or which are associated with a common clock generator unit. Alternatively, the first communication unit has two data connections, of which one data connection is operated as a data input and one data connection is operated as a data output, wherein the data connections are operated in sync with one another. The first communication unit may have a data output and a data input, wherein these are jointly connected directly or indirectly to the first data line.

The communication system preferably has at least one changeover unit which is designed and connected such that it can be used to change over between operation without a separate clock line at least between first and second communication units and operation in accordance with the serial peripheral interface standard with a separate clock line at least between first and second communication units. The changeover unit is actuated by the first communication unit, wherein the latter preferably has an additional changeover connection and said changeover connection is preferably connected to the changeover line by means of at least one connecting line.

The data transmission protocol may be in a form such that the first communication unit in a second data transmission mode transmits a data signal and a data request signal or clock signal essentially simultaneously and/or the clock signal embedded in the data signal and/or a common data clock signal at least to the second communication unit via the first data line. It is preferred for the data transmission protocol to be in a form such that a defined communication process comprises the transmission of a synchronization packet and/or of an identification packet and/or of a command packet and/or of an address packet from the first communication unit to at least the second communication unit via the first data line.

The first communication unit and/or the second communication unit preferably have a push-pull stage with a high side driver and a low side driver or have a high side driver with an optional pull down resistor or a low side driver with an optional pull up resistor. The first and second communication units respectively may have a push-pull stage for applying a respective output signal to the first data line. A high side driver is in this case preferably understood to mean an electronic circuit which applies an activated "High" signal to the first data line and/or sets an electrical variable on the first data line to a defined "High" value. A low side driver is in this case preferably correspondingly understood to mean an electronic circuit for setting an activated "Low" signal or "Low" signal value or applying an electrical potential, essentially corresponding to a ground potential.

It is preferred for the first and at least the second communication unit and also the data transmission protocol to be in a form such that the data signal and/or the data request signal or the clock signal are transmitted using defined current and/or voltage values or by means of optical data transmission on the first data line. In this case, provision is made for the data signal and/or the data request signal or the clock signal to be encoded by means of a defined signal form, comprising at least one defined signal edge and/or at least one signal pulse and/or at least one signal pulse pause.

The first communication unit may be in the form of a master unit and the second communication unit to be in the form of a slave unit and for the data transmission protocol to be in a form such that the first data transmission mode is designed as a slave send data transmission mode and/or the second data transmission mode is designed as a master send data transmission mode.

The first communication unit is preferably connected to at least the second communication unit by means of a two-wire interface which is used to transmit information, such as in current-encoded form, unidirectionally or bidirectionally. This involves the second communication device being supplied with electrical power via said two-wire interface.

The second communication unit may be in a form such that it can receive and independently interpret an identification packet and/or a command packet and/or an address packet and/or an ending packet from the first communication unit.

It is preferred for at least the second communication unit to be in a form such that it interprets the identification packet for a selection from at least two defined access methods and, on the basis of this interpretation, independently puts itself into a defined mode of operation and/or transmits a defined response to the first communication unit in accordance with the first data transmission mode, and/or independently prompts and executes an internal activity, wherein said internal activity comprises the storage of a defined data item or of a plurality of defined data items at one or more defined memory addresses.

The second communication unit is preferably integrated in a sensor and/or actuator unit.

The communication system preferably comprises a plurality of "slave" communication units which are each essentially in a form based on the second communication unit and are, for example, each connected to the first communication unit by means of a sole data line.

The method is preferably developed by virtue of the data signal from the second communication unit comprising a defined number of bits, for example, one bit, for the first data transmission mode.

At least for the first data transmission mode the clock signal from the first communication unit and the data signal from the second communication unit are preferably transmitted essentially simultaneously via the first data line.

It is preferred for the second communication unit to send the data signal in response to the data request signal or the clock signal from the first communication unit within a defined time interval which is preferably smaller than the period duration or a multiple of the period duration of the clock signal from the first communication unit and/or of the clock from a clock generator unit of the first communication unit.

Preferably the first communication unit in a second data transmission mode to transmit a data signal and a data request signal/clock signal essentially simultaneously and/or the clock signal embedded in the data signal and/or a common data clock signal at least to the second communication unit via the first data line.

The first communication unit preferably transmits a synchronization packet at least to the second communication unit via the first data line at the beginning of a defined, possibly self-contained, communication process with at least the second communication unit.

Alternatively, the second communication unit transmits a synchronization packet at least to the first communication unit at the beginning of a send process of its own.

A synchronization packet is understood to mean a signal in explicitly identifiable form and/or an appropriate signal/data sequence which is in a form such that a synchronization information item can be obtained from the occurrence thereof or from the respective reception time or transmission time or formation thereof, which synchronization information item can be used by at least one communication unit in order to synchronize its own communication with the other communication unit, from which the synchronization packet originates.

A defined communication process, such as subsequently, a synchronization packet and/or an identification packet and/or a command packet and/or an address packet is transmitted from the first communication unit to at least the second communication unit via the first data line. Using the identification packet, the first communication unit can select the communication subscribers at any time. By sending a synchronization packet, a new communication process can be initiated at any time. Furthermore, the synchronization packet can customize the data transmission speed/rate. By way of example, the identification packet can define the specific selection of communication subscribers within a communication process.

At the end of a defined communication process, an ending packet is preferably transmitted which, comprises a checksum so that an erroneously transmitted message can be identified. In a defined communication process additionally, for example subsequently, a message is transmitted from the first communication unit to the second communication unit in accordance with the second data transmission mode and/or a message is transmitted from the second communication unit to the first communication unit, in accordance with the first data transmission mode, via the first data line.

It is preferred for the synchronization packet to comprise an explicitly identifiable starting block signal which has a starting pulse pause of defined length and a starting pulse of defined length and/or have a starting pulse/starting pulse pause signal, wherein the duration ratio of the starting pulse to the starting pulse pause has a defined, possibly identifiable, magnitude and/or which has an explicitly identifiable sequence of starting pulses and starting pulse pauses with a respectively defined duration. Preferably at least the second communication unit ascertains a clock reference variable from the explicitly identifiable starting block signal and, preferably subsequently, uses said clock reference variable to customize its own defined data request signal/clock signal response signal time interval or to customize its own response time.

Preferably the identification packet comprises an information item for a selection from at least two defined access methods which the second communication unit interprets and subsequently puts itself into a defined mode of operation and/or according to which the second communication unit transmits a defined response to the first communication unit, for example in accordance with the first data transmission mode, and/or independently prompts and executes an internal activity, wherein said internal activity comprises the storage of a defined data item or of a plurality of defined data items at one or more defined memory addresses.

The identification packet preferably comprises an information item regarding whether the current communication process relates to all further communication units ("broadcast message"), such as all the slave units connected to the sending communication unit, or one or more individual communication units, for example just the second communication unit, and whether these can expect further information, or whether one or more or all further communication units are intended to execute one or more defined internal activities or actions ("EID" or "event ID"), as a result of which one or more such internal activities can be prompted in sync. The identification packet can therefore be used to choose between different communication types at runtime or flexibly within a communication process. Furthermore, the communication subscribers or the addressees of the communication or of the respective communication process can be defined.

The command packet preferably comprises an information item regarding the type of the access by the first communication unit to the second communication unit or vice versa and, in this context, whether a read access operation and/or a write access operation is intended to be performed. In this case, the command packet preferably defines whether direct or indirect memory access using an address pointer is effected. In addition, the command packet preferably defines whether the aim is to access one or more memory addresses and/or whether the aim is to perform random access (in the case of a memory address or a "random burst" in the case of a plurality of memory addresses) or linear or incremental memory access (an "incremental burst" for a plurality of memory addresses) or bit-by-bit access ("read-modify-write") or implicit access ("inherent"), in which the one or more memory addresses are part of the command. This type of command packet, which defines at least one of the access operations described above, allows flexible access to be performed at run time or within a communication process, said access being able to be customized in the form of the command packet by the first communication unit or the master unit, depending on the operating state.

The at least one address packet, which is preferably transmitted after at least one command packet, defines or comprises the information of the one or more memory addresses to which read and/or write access is intended to be effected.

The message preferably comprises a data item or a plurality of data items or data packets, said data item/said data items or data packets particularly having a respectively associated plurality of appropriate data signals which are transmitted via the first data line.

Preferably the data transmission protocol to be in a form such that first of all a synchronization packet is optionally transmitted, then one or more identification packets, for example a sole identification packet, then one or more command packets, for example a sole command packet, then one or more address packets, then a message, comprising one or more data packets, or a plurality of messages, such as a message from the first communication unit to the second and/or a message from the second communication unit to the first, and optionally an ending packet to finish, are transmitted via the first data line.

Within a communication process, individual or all packets or parts of a packet, for example the identification packet and/or one or more data packets, are preferably transmitted or sent redundantly, which can increase the reliability of the communication process. The communication units and/or the data transmission protocol are designed for redundant data and/or packet transmissions of this kind.

Preferably a redundant inverted data transmission, for example of a message, takes place within a communication process by virtue of access, such as by means of the command packet, to redundant data sources (same content of at least two different data sources), at least one of which holds the redundant content in a different form or coding (e.g. in inverted form), effecting multiple transmission of a data content in a different form.

Preferably, the identification packet is transmitted redundantly within a communication process by protecting the activities of the communication units which are to be synchronized by means of redundant transmission of the "Event ID" by the first communication unit.

As an alternative preference, redundant inverted transmission of the identification packet takes place within a communication process by virtue of the activities of the communication units to be synchronized being protected by means of redundant transmission of the "Event ID" by the first communication unit such that the "Event IDs" to be transmitted redundantly are transmitted in a different form (e.g. in inverted form).

Preferably, a status information item is transmitted within a communication process by virtue of the communication unit which is being accessed, for example the second communication unit, transmitting status information in order to notify the unit which is effecting the access, for example the first communication unit, of information about the state of the unit transmitting the data and/or the validity of the data themselves. For example, a configurable status information item is transmitted by virtue of the communication unit which is being accessed transmitting status information within the communication process in order to notify the communication unit which is effecting the access of information about the state of the unit transmitting the data or the validity of the data themselves, and by virtue of the type and/or number of the status information items to be transmitted being configurable. Preferably status information configurable at runtime is transmitted by virtue of the communication unit which is being accessed transmitting status information within the communication cycle in order to notify the communication unit which is effecting the access of information about the state of the unit transmitting the data or the validity of the data themselves, and by virtue of the type and/or number of the status information items to be transmitted being dependent on the content of a memory cell of the communication units which are being accessed which is able to be changed by at least one other communication unit at runtime.

An echo is transmitted within a communication process by virtue of the unit which is being accessed at least partially repeating the information items transmitted by the accessing unit in order to acknowledge correct reception; in some embodiments, an echo from the identification packet and/or the command packet and/or the address packet and/or the ending packet is transmitted by virtue of the communication unit which is being accessed, for example the second communication unit, transmitting an at least partial repetition of the relevant packet to the first communication unit in order to acknowledge or confirm reception of the relevant packet.

The ending packet is preferably transmitted to the first communication unit again as an echo from the communication unit which has been accessed, for example the second communication unit, said echo comprising an at least partial repetition and/or checking data formed or calculated on the basis of the originally transmitted data/packets. Alternatively, the ending packet may be transmitted from the accessing unit, for example the first communication unit, to the other communication unit(s) as at least partial repetition and/or checking data packet at the end of a communication process.

It is preferred for a time reference for determining the age of a data item to be transmitted within a communication process by virtue of the unit which is being accessed, for example the second communication unit, forming a time information item for the age of data and transmitting said time information item with the data to the accessing unit.

Preferably, a counter for an internal time reference is transmitted within a communication process by virtue of the unit which is being accessed forming a time information item for the age of data and transmitting said time information item with the data to the accessing unit, wherein the time information item is formed by counting K2-internal events (e.g. internal timer). Alternatively, a counter for an external time reference (MSG-CNT) may be transmitted by virtue of the unit which is being accessed forming a time information item for the age of data and transmitting said time information item with the data to the accessing unit, wherein the time information item is formed by counting events (e.g. the number of communication cycles recognized) which are external to the unit which is being accessed, for example the second communication unit.

The first communication unit or master unit is preferably comprised by a controller and/or an electronic control unit, and at least the second communication unit or first slave unit is comprised by a sensor and/or actuator and/or another electronic control unit.

The data transmission protocol preferably defines a digital interface which provides options for increasing the data transmission rate between components or first and second communication units or master and slave units, which may involve the transmission of not only useful data but also supplementary data for protecting the signal conditioning and the data transfer. Besides the options of increasing safety, interference immunity and robustness for the data transmission, digital interfaces provide greater flexibility and scalability than analog interfaces, for example. The sequential data transmission and the correspondingly small number of connecting lines or data lines, such as the sole data line, allow costs to be reduced for the interface connection and allow potential sources of error as a result of contact problems to be minimized.

At least one aspect of the invention described here allows for the connection of sensors, actuators and controllers with a minimal number of connecting and communication lines. This has all the advantages of bidirectional digital data transmission with regard to transmission safety, interference immunity, robustness and flexibility with reduced costs as a result of the small number of hardware components and standard hardware components (standard serial peripheral interface module), which also reduces the software complexibility/code overhead and computation runtime.

At least one aspect of the invention accordingly also relates to a communication unit and/or a data transmission method for bidirectional, serial data communication between the first communication unit/master unit, for instance in the form of a microcontroller, and the second communication unit/first slave unit, for instance in the form of a sensor or actuator, with a standard serial peripheral interface. Reduction to just one signal line while retaining the full functionality provides cost-efficient and development-efficient interface implementation. Compatibility with the standardized synchronous serial peripheral interface, which is available on most conventional microcontrollers with 3 signal lines+Slave Select line, is also possible with this one signal line or the first/sole data line and may be realized without additional logical/electronic components or bus drivers. In comparison with analog or quasi-digital transmission, digital data transmission does not corrupt the signal, which is why other useful data can also be transmitted without losses. The tolerances which have disappeared as a result of digital or loss-free data transmission can be distributed elsewhere in the design and mass production of sensors and actuators, which has a cost-reducing effect.

The communication system preferably has an overvoltage protection diode or "transient voltage suppressor diodes (TVS)", which increase the system's ESD robustness, at least one output/input of at least the second communication unit and/or at least one output/input of all slave units and/or of the first communication unit.

Preferably the communication system has capacitors on signal lines or at least on the first data line which influence the rise and fall times of the signal edges and hence the emitted spurious radiation in a desired or defined manner.

In order to ensure an "idle high voltage level" for the first communication unit, for example upon initialization, it preferably has a "pull up" resistor which sets the signal value on the first data line to a defined "High" level if no communication subscriber is transmitting data via the first data line.

The term OSPI is preferably understood to mean a single-wire Serial Peripheral Interface (one wire serial peripheral interface).

The communication system preferably has just a single master unit as first communication unit and no separate clock transmission line.

The first communication unit/master unit is preferably connected to, and even integrated in, an electronic control unit ECU. The ECU preferably receives the data received by the master unit and evaluates said data.

Preferably in accordance with the data transmission protocol, the data request signal from the first communication unit is transmitted periodically with an undefined clock time or sporadically to at least the second communication unit via the first data line.

It is preferred that, in accordance with the data transmission protocol, the data request signal from the first communication unit is used as clock source for the data transfer clock and as clock source for at least one further communication unit with inaccurate timing.

The data request signal is preferably output on or applied to the first data line/common connecting line by the first communication unit. The second communication unit recognizes the data request signal and for its part actuates an appropriate bit of the data signal on the common first data line. As soon as the second communication unit has recognized the request signal from the first communication unit, the sending of the data signal from the second communication unit can begin, regardless of the current data request signal. If the second communication unit is of "dominant" design, the summed signal on the first data line at the time of data acceptance by the first communication unit corresponds to the data signal from the first communication unit without it being absolutely necessary for the data request signal to be disconnected. In this case, both the data request signal and the data signal may be active simultaneously.

For the purpose of transmitting their data and synchronization signals, both the first communication unit and the second communication unit preferably use the same physical variable, for example voltage or current. Alternatively, different physical variables may be used.

Preferably, the first and second communication units use the same values or value ranges or levels for signal transmission. As an alternative preference, they use different values/value ranges/levels.

If a slave needs to be reconfigured to be the master and vice versa, it is necessary for reconfiguration of the output circuitry to be used to ensure that a slave can overwrite the signals from the master on the single-wire connecting line. It is then possible for the new master to be operated with a standard "serial peripheral interface" module and for the new slave to be operated with an OSPI configuration, for example.

In addition, a slave can preferably also be operated using an OSPI converter, which extracts the clock from the data signal and makes it available on separate lines. It is therefore possible to use slave communication units with standard "serial peripheral interface" modules. The advantage is that the transmission can be reduced in sections to at least one connecting line which contains both data and the clock signal.

A master unit (master) can preferably have one or more slave units or slave communication units or slaves connected to it, with individual slave communication units in turn themselves being able to be master units for further subordinate slave communication units. To this end, the first slave communication units, which are used as masters for subordinate slaves, should have separate "serial peripheral interface"/OSPI modules or have the option of decoupling from the primary bus and/or of reconfiguring to a master and slave configuration.

The electronic communication system is preferably based on serial, synchronous data transmission and comprises at least one first communication unit or master unit which initiates the communication and at least one second communication unit or slave unit K2 which reacts thereto, wherein during the communication the time base for the transmission of the data elements in both directions is prescribed by the unit which initiates the communication.

The electronic communication system is preferably in a form for use in the automotive sector.

The electronic communication system is expediently in a form or designed for safety-relevant applications.

The electronic communication system preferably comprises a synchronous or, alternatively, an asynchronous bus.

At least one aspect of the invention also relates to the use of the electronic communication system in motor vehicles. The communication system is provided for connecting sensors, such as pressure sensors, and/or actuators in a motor vehicle. Alternatively, the invention relates to the use of the electronic communication system and the method in automation engineering.

The constantly rising number of sensors, actuators, electrical control and regulatory components within conventional motor vehicles and the simultaneous demand for extended functionalities at the same or lower cost require flexible and demanding opportunities for communication by controllers and sensors/actuators. Since many of these components also have significant influence on driving dynamics in the automotive sector, it is necessary to observe relevant requirements in terms of the safety and robustness of the signals, data and systems, which are met by the communication system and data transmission method described herein.

Further embodiments may be found in descriptions of exemplary embodiments with reference to the figures described below.

BRIEF DESCRIPTION OF THE DRAWINGS

The invention is best understood from the following detailed description when read in connection with the accompanying drawings. Included in the drawings is the following figures:

FIG. 5 shows an exemplary signal form for the second data transmission mode, FIG. 14 shows different exemplary embodiments of the communication system, and FIG. 15 shows the block diagram of an exemplary converter.

DETAILED DESCRIPTION OF THE PREFERRED EMBODIMENTS

Figure 1:
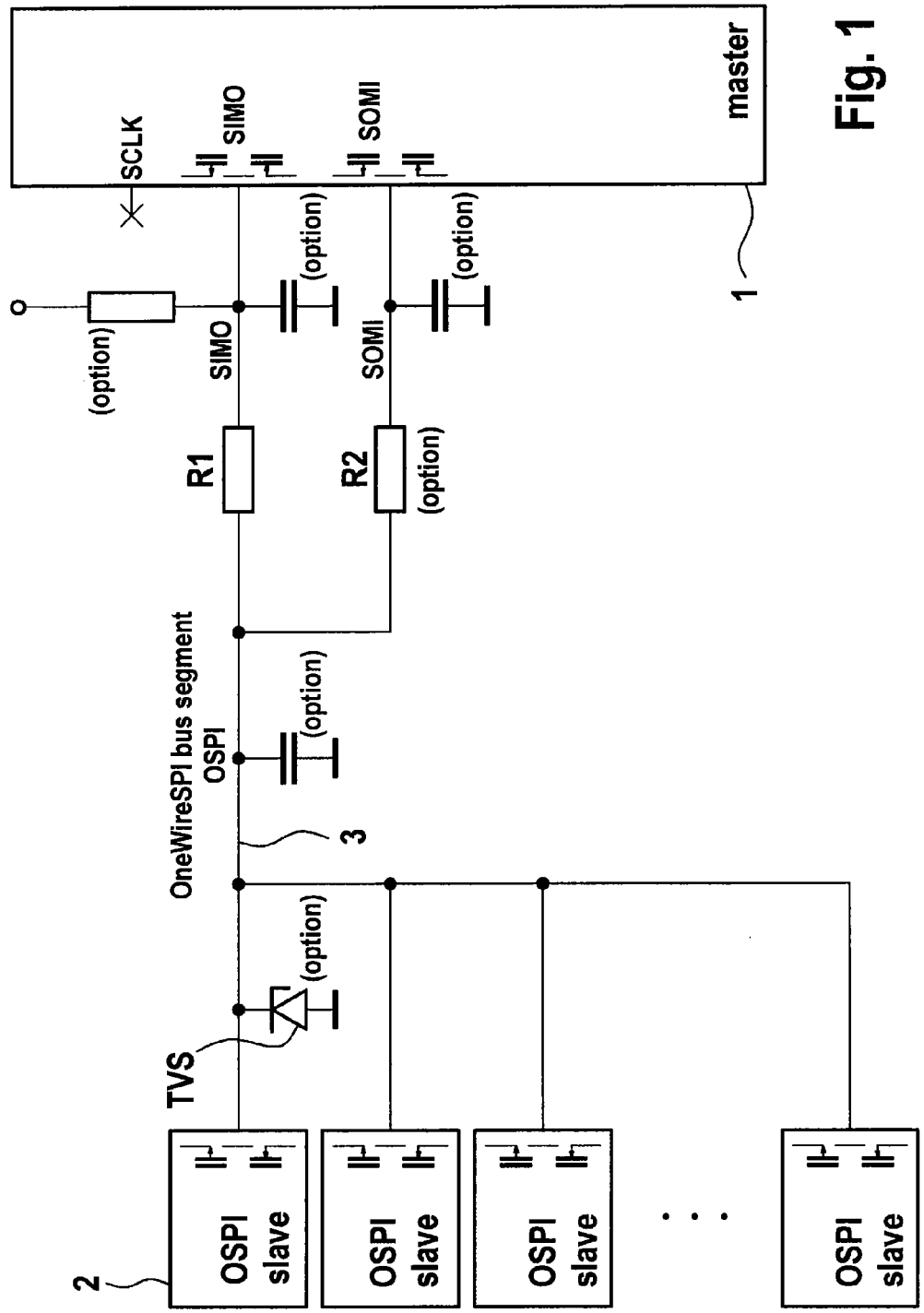
FIGS. 1 and 2 show exemplary communication systems.

FIG. 1 shows an exemplary communication system having a first communication unit 1 or master unit 1 which is connected via the first data line 3 to a second communication unit 2 or a first slave unit 2 and further slave units "OSPI slave" (one wire serial peripheral interface). The first communication unit 1 has an integrated clock generator unit which provides the clock signal SCLK. Furthermore, the master unit 1 has an output channel SIMO (slave in master out) and an input channel SOMI (slave out master in) which, by way of example, are respectively connected by means of a resistor R1, R2 to the first data line 3. The output channel SIMO and the input channel SOMI are actuated by or operated with the integrated clock generator unit in this case. In a second data transmission mode or a master send data transmission mode, the master unit 1 uses the output channel SIMO to transmit a clock signal SCLK, which is provided internally by the clock generator unit, at the same time as output data. The outputs of the slave units, such as the second communication unit 2, are each in a high impedance state. The slave units read the SIMO data via the first data line 3.

The slave units for their part use a first data transmission mode or slave send data transmission mode to transmit their data regardless of the signal level from the SIMO output which is currently being applied to the first data line 3, wherein the slave-end sending of the respective data signal is synchronized by virtue of the data signal always being transmitted in response to a clock signal from the first communication unit 1 via the first data line 3. This clock signal is applied to the output SIMO of the master unit 1 and is likewise transmitted via the first data line 3. The respective data signal from the second communication unit 2 or from the first slave unit 2 is received by the master unit 1 via the SOMI input.

The first data line 3 is also called a "one wire serial peripheral interface" bus segment. In line with the example, each slave unit has an overvoltage protection diode (transient voltage suppressor diodes) TVS in order to attain improved electromagnetic compatibility for the communication with the slave units.

Figure 2:
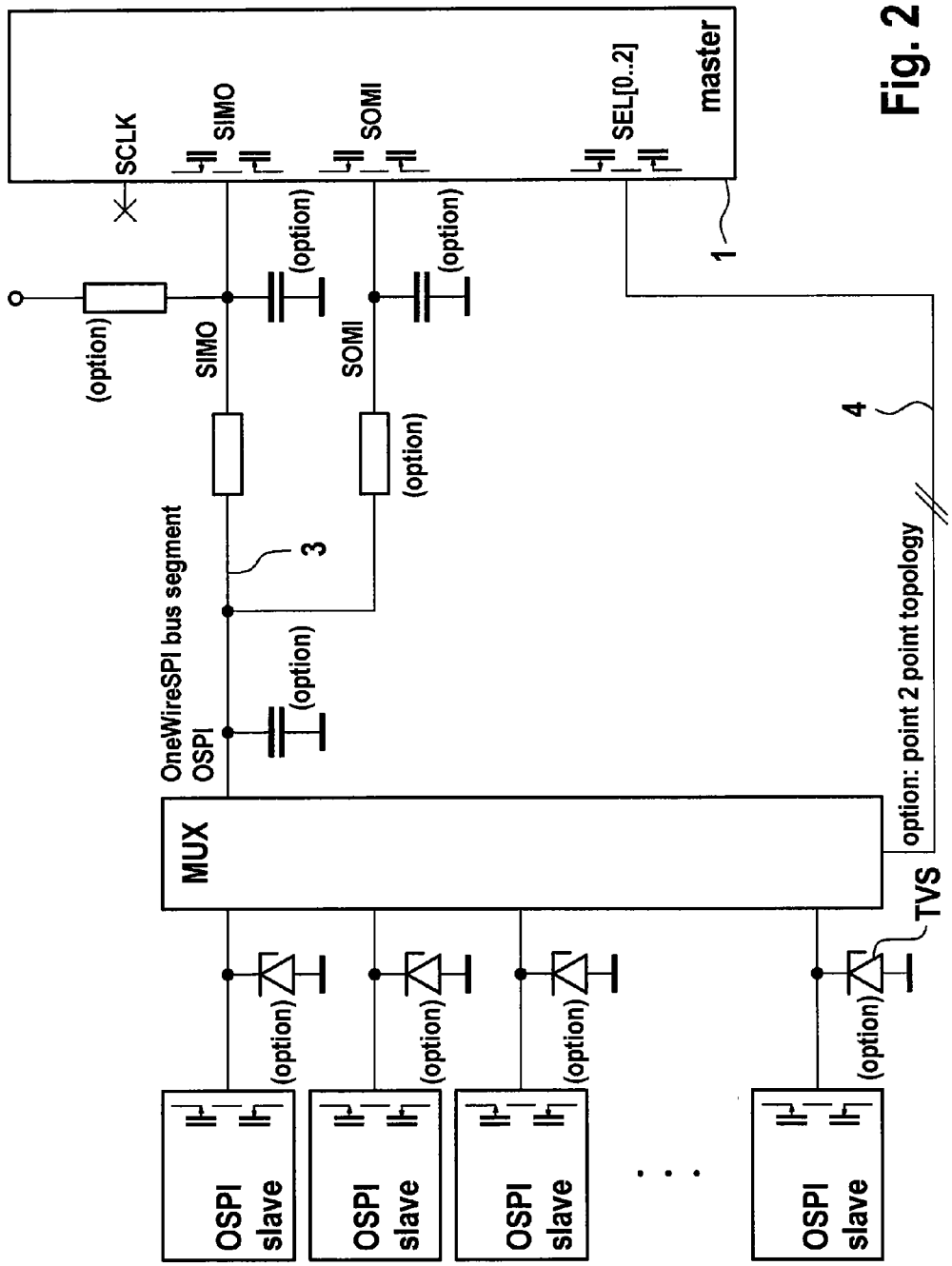

The exemplary embodiment of the communication system which is shown in FIG. 2 has, in contrast to FIG. 1, an additional multiplexer unit MUX to which all the slave units "OSPI slave" are connected. In addition, the master unit 1 is connected to the Select input of the multiplexer unit MUX by means of a control line 4 and in this way controls the communication by means of the slave units via the first data line 3 for the subscriber selection. In line with the example, each slave unit has an overvoltage protection diode (transient voltage suppressor diodes) TVS in order to attain improved electromagnetic compatibility for the communication with the slave units. In line with the example, the multiplexer unit suppresses undesirable output signals from an unselected slave unit.

Figure 3:
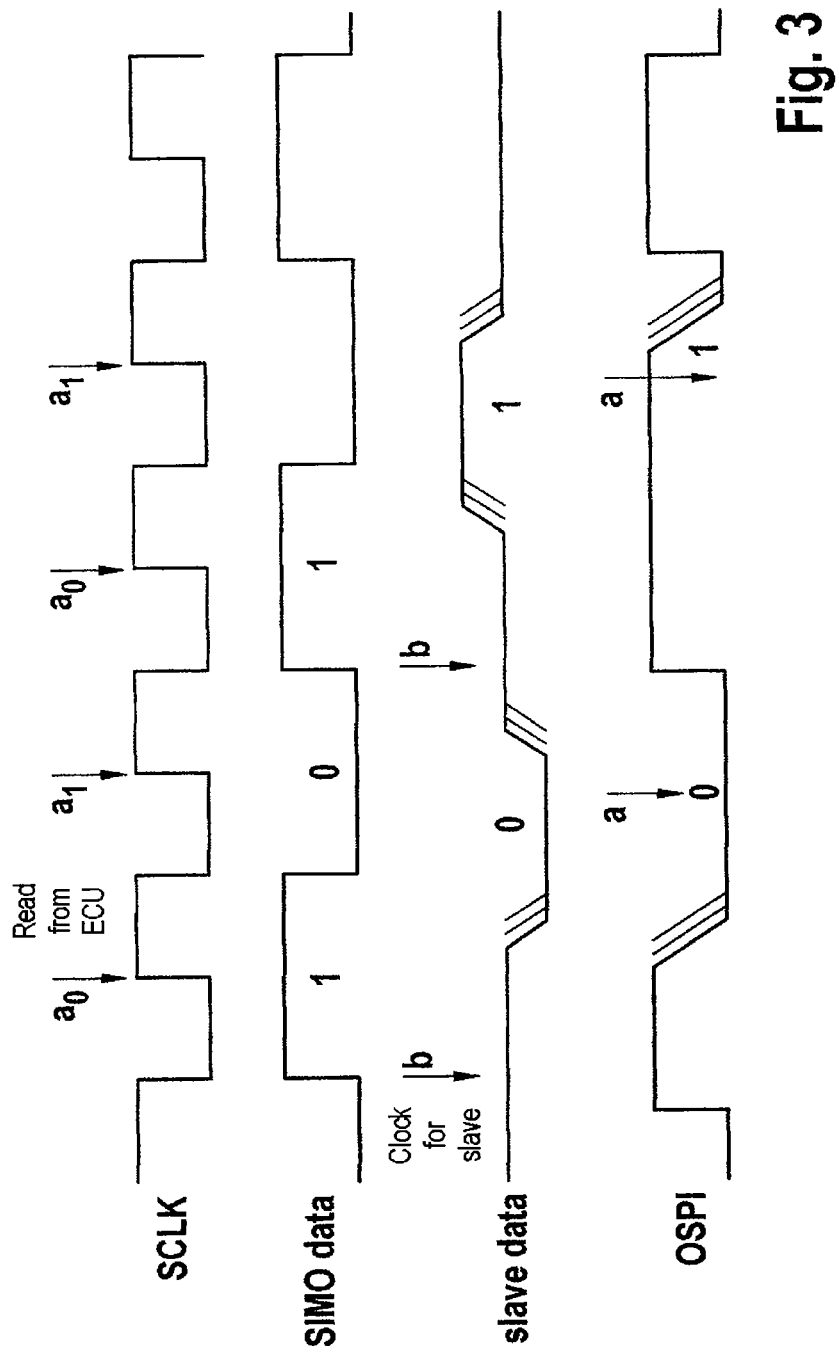
FIGS. 3 and 4 show an exemplary data transmission in accordance with the first data transmission mode.

FIG. 3 shows an exemplary first data transmission mode or a slave send data transmission mode for the data transmission protocol between a first communication unit or master unit and a second communication unit or first slave unit. The clock signal SCLK from the master unit prescribes, at double frequency, the clock for an alternating digital signal SIMO which is transmitted via the data line to the slave as a clock signal or data request signal for synchronization, since, in line with the example, said slave has no clock generator unit of its own or, although it has a clock generator unit, said clock generator unit at least does not operate in sync with the clock generator unit of the master unit. The rising edge b of the respective "high" level provides the slave unit with the send command, wherein the slave unit needs to respond within a defined time window, namely after the respective time $a_0$, which is defined by a rising edge of the clock signal, and before the respective time b, which prompts the respective subsequent sending by the slave unit. The master unit reads at the times $a_0$ and $a_1$ in each case, with only the data which are read at time $a_1$ being used, by way of example. The data sent by the slave unit are illustrated by the "slave data" row, and the total data on the data line OSPI or the respective total signal level are/is illustrated by OSPI. In this case, the clock signal SIMO data, which is dependent on the clock signal SCLK, and the data signal from the slave unit "slave data" are overlaid and are transmitted essentially simultaneously via the data line. In the exemplary embodiment, the master unit thus reads a "0" and a "1". The sending rhythm and the "timing" of the slave unit are determined by the SIMO data from the master unit and via the form of the slave unit. The holding time for the slave data must in each case extend at least up to the next read-in time $a_1$ of the master. The clock signal "SIMO data" transmitted from the master unit to the first slave unit ensures synchronized data transmission in the first data transmission mode.

Figure 4:
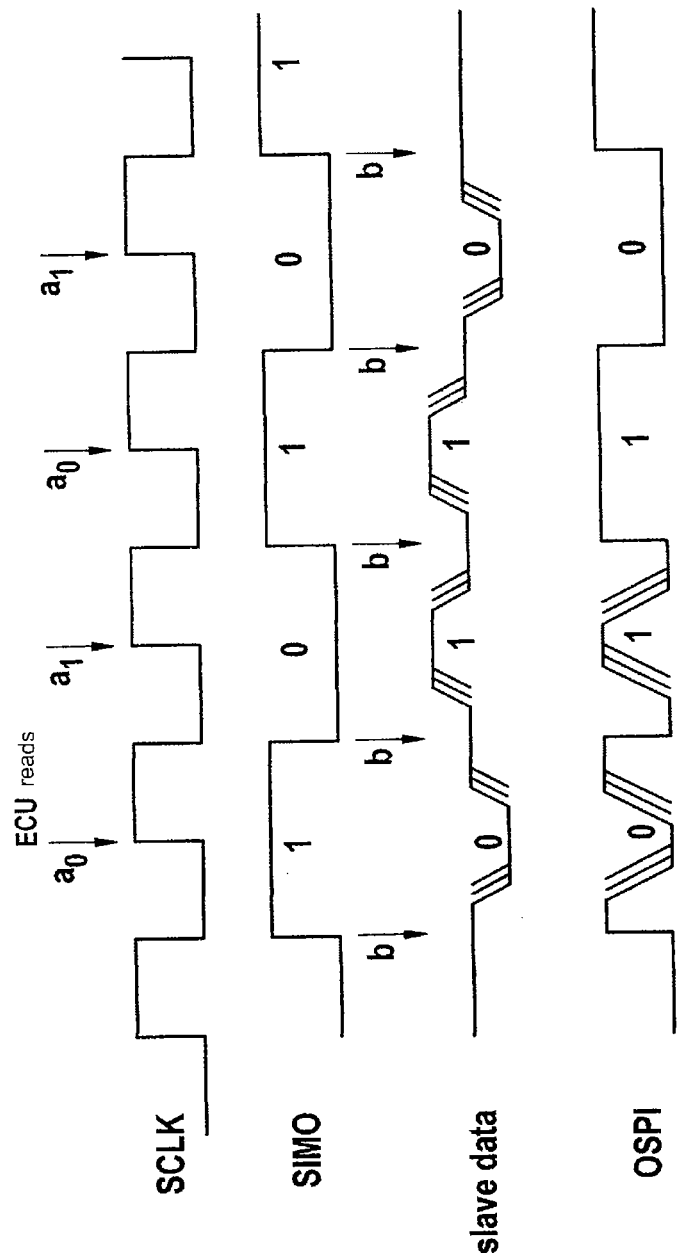

FIG. 4 shows an exemplary double rate mode for the first data transmission mode or slave send data transmission mode, in which the slave unit respectively sends upon a rising and falling edge of the alternating High level of the SIMO signal, or sends after said relevant edge. The master unit reads at the times $a_0$ and $a_1$ in each case, with the data captured at both times being used further, in line with the example by an ECU connected to the master unit. The protocol illustrated in FIG. 4 is otherwise based on that described in FIG. 3. In this case too, the slave unit has no clock generator unit of its own or has a clock generator unit which does not operate in sync with the clock generator unit of the master unit.

As an alternative example, asymmetric clock coding schemes or data transmission modes are also proposed, for example with a 2:1 or 3:1 rate instead of the 1:1 rate illustrated in FIGS. 3 and 4.

In an example which is not shown, the clock signal from the first communication unit or master unit is replaced by a non-periodic data request signal, wherein the data transmission in the first data transmission mode may be flexibly determined by the master unit, both in terms of the data rate and in terms of the respective time of the data request.

FIGS. 5a) and 5b) illustrate exemplary coding schemes for a second data transmission mode or master send data transmission mode, which comprises no successive "Low" or "High" bits so that the data of the master send data transmission mode may be distinguished from the synchronization packet. By way of example, a fast edge change signifies a "0" and a slow edge change signifies a "1". The data which follow the synchronization packet, which are coded in line with one of these coding schemes, are used, in line with the example, to transmit the information about the selection of a communication partner or an identification packet and optionally further information packets, for example a command packet, an address packet and data packets, to one or more slave units.

By way of example, the data transmission protocol comprises the transmission of a synchronization packet from the first communication unit to at least the second communication unit at the beginning of a communication process, as a result of which the second communication unit or the first slave unit or all the slave units can passively and/or actively participate in the communication process in sync. This synchronization packet has an explicitly identifiable or separate and unmistakable pattern in order to distinguish itself from the other signals or signal patterns and thus to explicitly indicate the start of a new communication process.

Figure 6:
FIG. 6 shows an exemplary synchronization packet.

Such a synchronization packet frame sync token is illustrated by means of FIG. 6 and comprises a series of 4 "low level" items as a starting pulse pause, 1 "high level" item as a starting pulse and a final "low level". From the pulse-pause-to-pulse ratio of 4 to 1 in line with the example, the second communication unit or the respective slave unit can obtain a clock reference variable which is used to customize its own response time interval or data request signal/clock signal-response signal time interval. On the basis of a relatively inaccurate clock generator unit for the slave unit, provision is made, by way of example, for the slave unit to recognize the synchronization packet as such when there is just a relatively small number of successively transmitted "low" bits, for example three.

Figure 7:
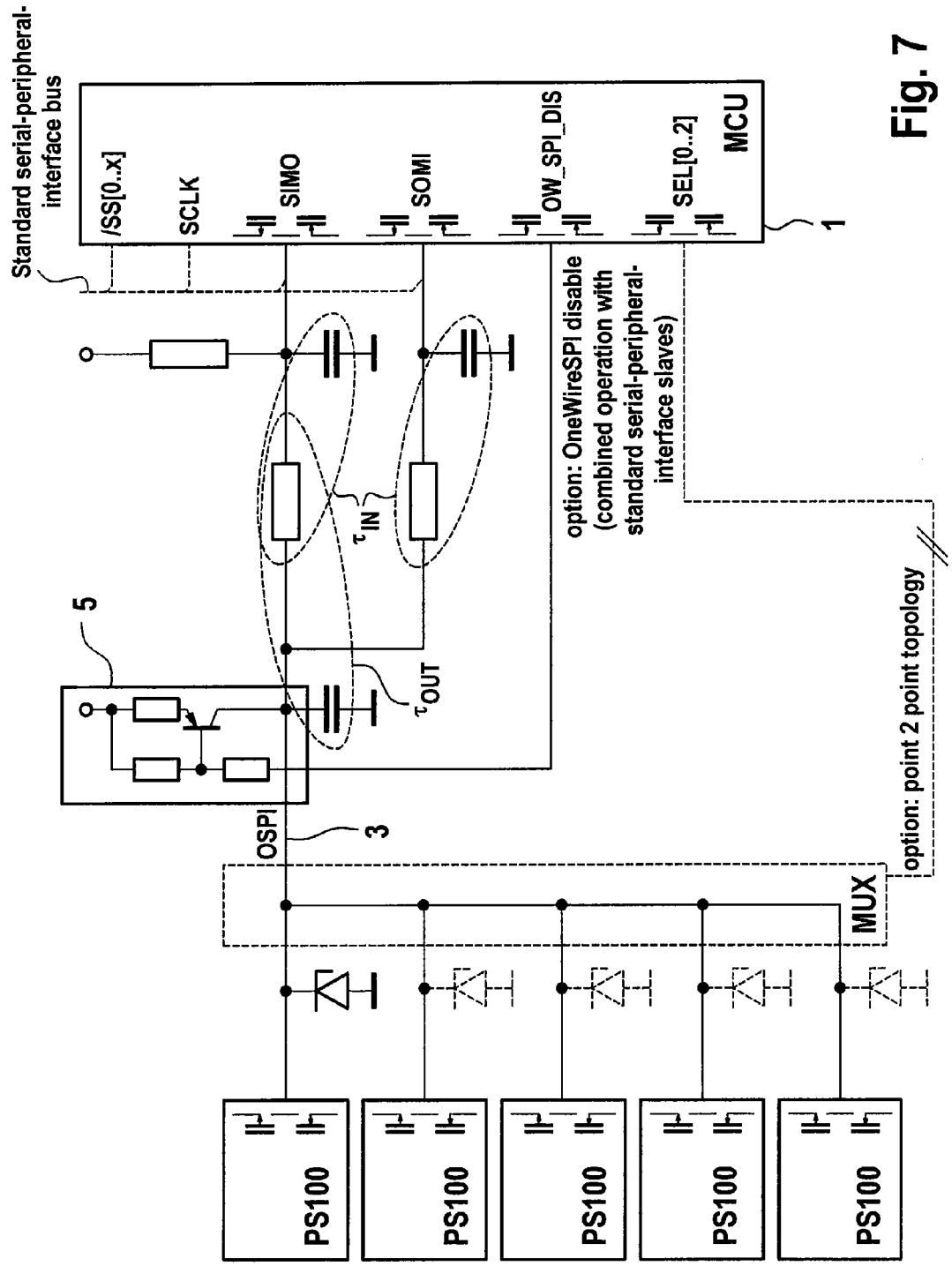
FIG. 7 shows an exemplary communication system with electronic supplementary elements for improving EMC (electromagnetic compatibility)

FIG. 7 shows an exemplary embodiment of the communication system, which has a changeover unit 5 which the communication system and specifically the first communication unit 1 or master unit 1 can use to change over between operation with a first data line 3 as sole data line or data transmission line and a serial peripheral interface normal mode with a plurality of data lines, for example four, and a clock line in accordance with the serial peripheral interface bus standard. Said changeover is effected using the OneWi-reSPI disable or OW_SPI_DIS output of the first communication unit 1, which output is connected to the changeover unit 5. In line with the example, the master unit 1 is connected so as to be able to be used for both modes of operation. In this exemplary embodiment, the first communication unit 1 or master unit 1 has two data connections SIMO, SOMI, of which one data connection SIMO, SOMI is operated as a data input and one data connection SIMO, SOMI is operated as a data output, the data connections SIMO, SOMI being operated in sync with one another. Furthermore, an optional multiplexer MUX is also shown which can be used to select a slave unit using the Select output SEL of the master unit. The additional electronic elements TIn and TOut are used for the electrically symmetrical connection of the first data line 3 and to increase EMC.

Figure 8:
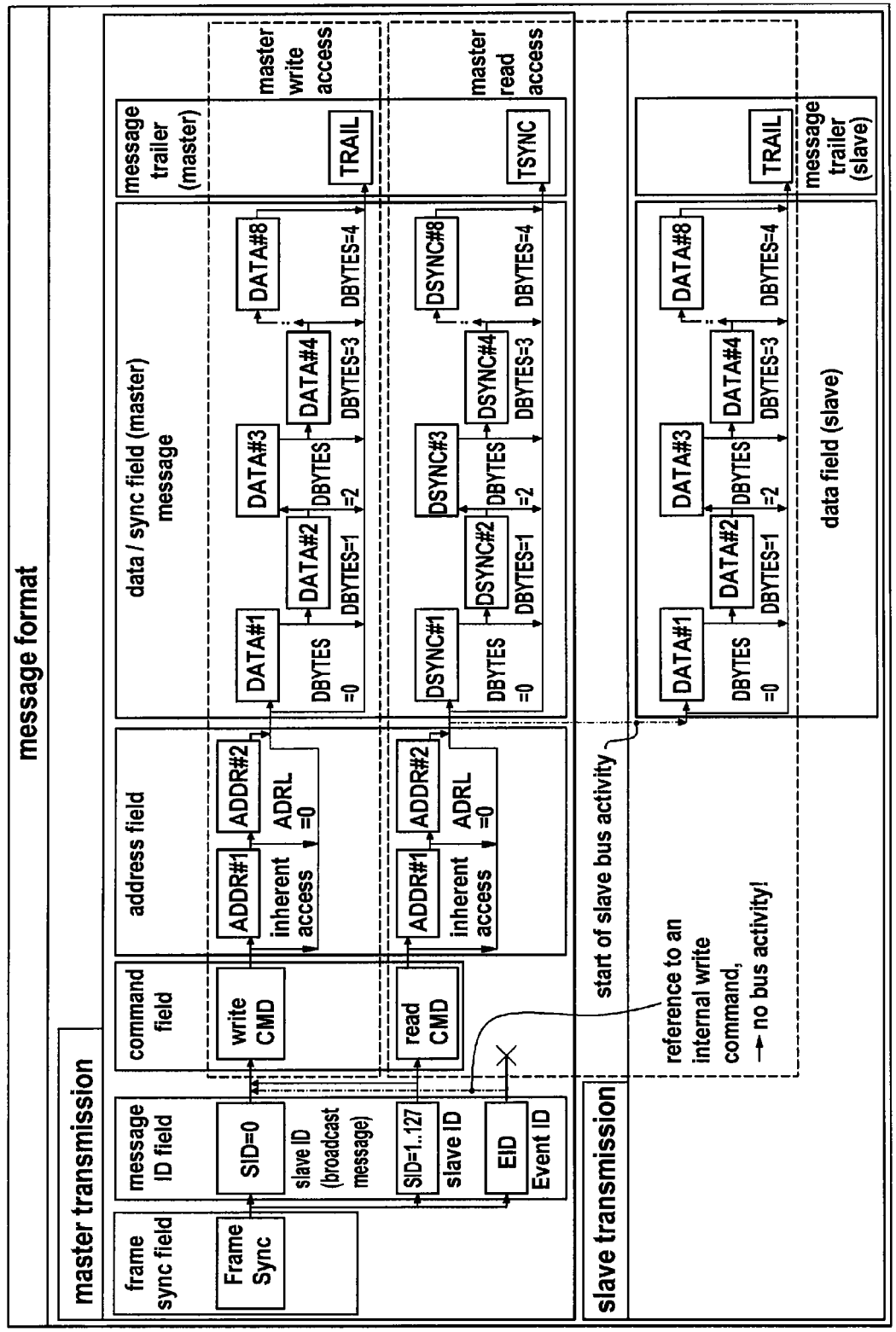
FIG. 8 shows an exemplary data transmission protocol with a determined data format or code format.

FIG. 8 shows the exemplary form of data transmission processes in accordance with the data transmission protocol, wherein a message "message" is transmitted from the first communication unit to the second communication unit using the second data transmission mode "master transmission" and from the second communication unit to the first communication unit using the first data transmission mode "slave transmission". In this case, the message respectively comprises a plurality of data packets DATA#n which can be distinguished in terms of their sender, that is to say master or slave.

First of all, the first communication unit or the master unit sends a synchronization packet Frame Sync which is used for synchronizing the communication with the second communication unit or the at least first slave unit or the further bus subscribers and initiates a communication process. This is followed by an identification packet ID, which is used either to identify the destination SID (slave ID) or to identify a routine which is to be executed or an event EID (event ID). By way of example, an EID identification packet produces no further communication in a direct manner, because commands and addresses associated with this event are already stored in each slave. For the case SID=0 further information or instruction packets to all further bus subscribers (broadcast message). By way of example, said packets are a command packet, comprising a write command write CMD for a pure send process in the master unit, address packets ADDR#1, ADDR#2 and a message in the form of data packets DATA#1 to DATA#8. Finally, the communication process comprises the transmission of an ending packet TRAIL which contains check data.

In addition, a communication process is illustrated in which a slave ID (identification) SID from a particular slave unit is sent as an identification packet by the master unit. The master unit then sends a read command read CMD as command packet and two address packets ADDR#1, ADDR#2. Subsequently, the slave unit responds with the data stored at these addresses and sends these data to the master unit. The master unit then sends request signals DSYNC# 1 to DSYNC#8 for synchronizing the data transmission of the slave unit, to which the slave unit respectively responds with one of the data packets DATA#1 to DATA#8. This data transmission is terminated with an ending packet TRAIL which is likewise sent by the slave unit in response to a request packet from the master unit TSYNC.

In line with the example, the master unit and the slave unit communicate exclusively via the first data line as sole data line.

Figure 9:
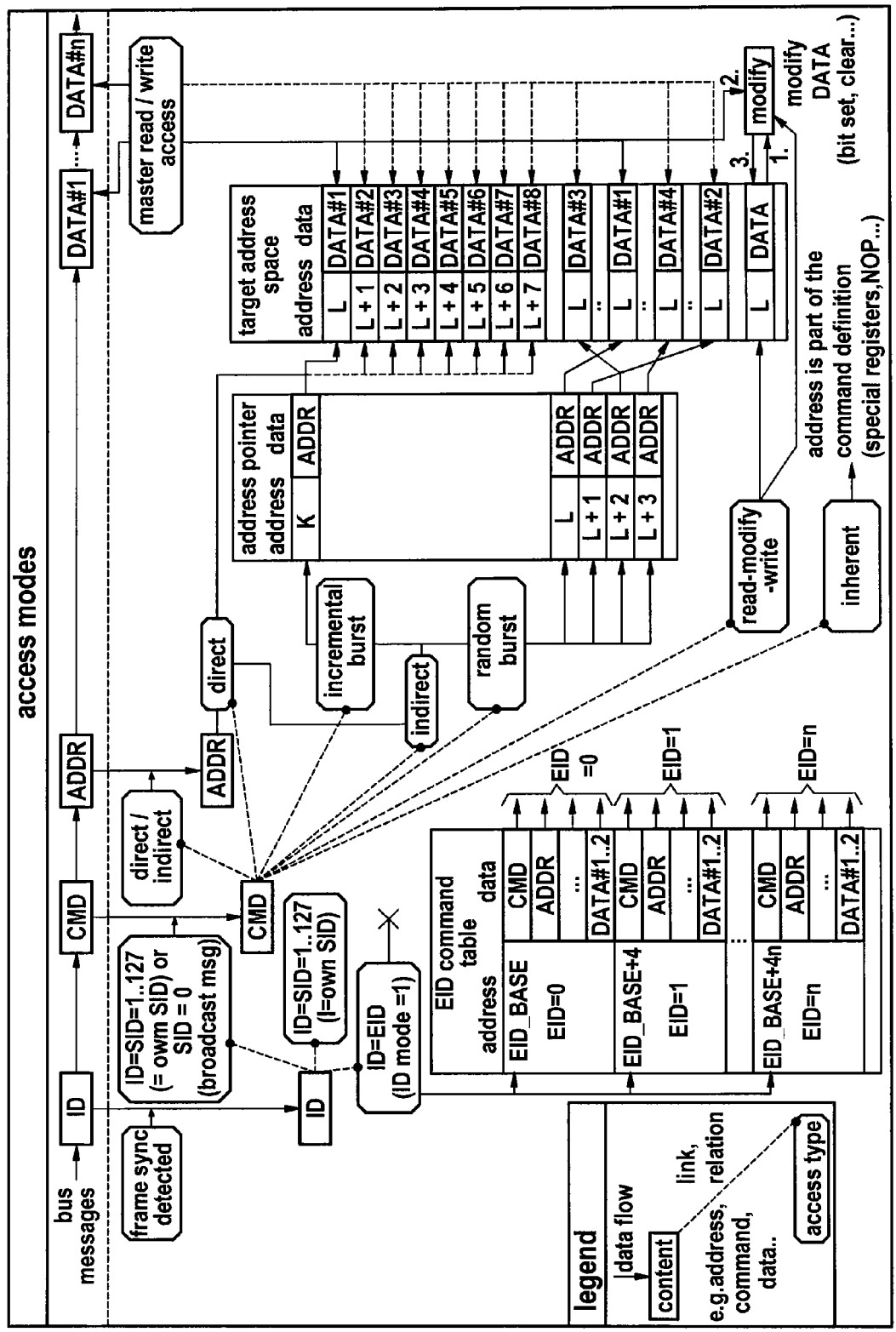
FIG. 9 shows an exemplary embodiment of the data transmission protocol for data access by the initiating unit or first communication unit (master)

By way of example, FIG. 9 illustrates the information and signal processing of a second communication unit or a slave unit in co-operation or in response to a message from the first communication unit or the master unit. In this case, the slave unit detects a synchronization packet or synchronization signal frame sync—not shown—from the master unit at the beginning of the communication process. Subsequently, an identification packet ID sent by the master unit is evaluated. If this contains an Event ID EID then this event is interpreted using an EID command table stored in the slave, and the relevant routine is executed using the stored command and address packets and the stored data. In this case, this execution takes place, in line with the example, within each slave unit connected to the same bus, wherein the slave units do not respond but rather store possible results only at defined memory addresses of their own.

If the identification packet comprises a slave ID SID which comprises one or more bits then the slave unit interprets this as a still incomplete communication process with the master unit and interprets the subsequent command packet CMD, which comprises the information regarding whether read or write access is meant to take place and whether said access is effected for a direct address directly or indirectly using a pointer and whether said memory access using the pointer is intended to be carried out "linearly" or incrementally, incremental burst, or "randomly", random burst. Alternatively, the command packet CMD may have read or write access, in which case the address is contained implicitly, "inherent", or in which case bit-by-bit access is carried out, "read-modify-write".

In line with the example, the slave unit comprises a memory manager with address pointers—address pointer—and a memory which may comprise registers and/or RAM and/or EEPROM and/or another type of memory. At the end of the message, the master unit or the slave units sends a message or useful data in the form of data packets DATA#1 to DATA#n.

Figure 10:
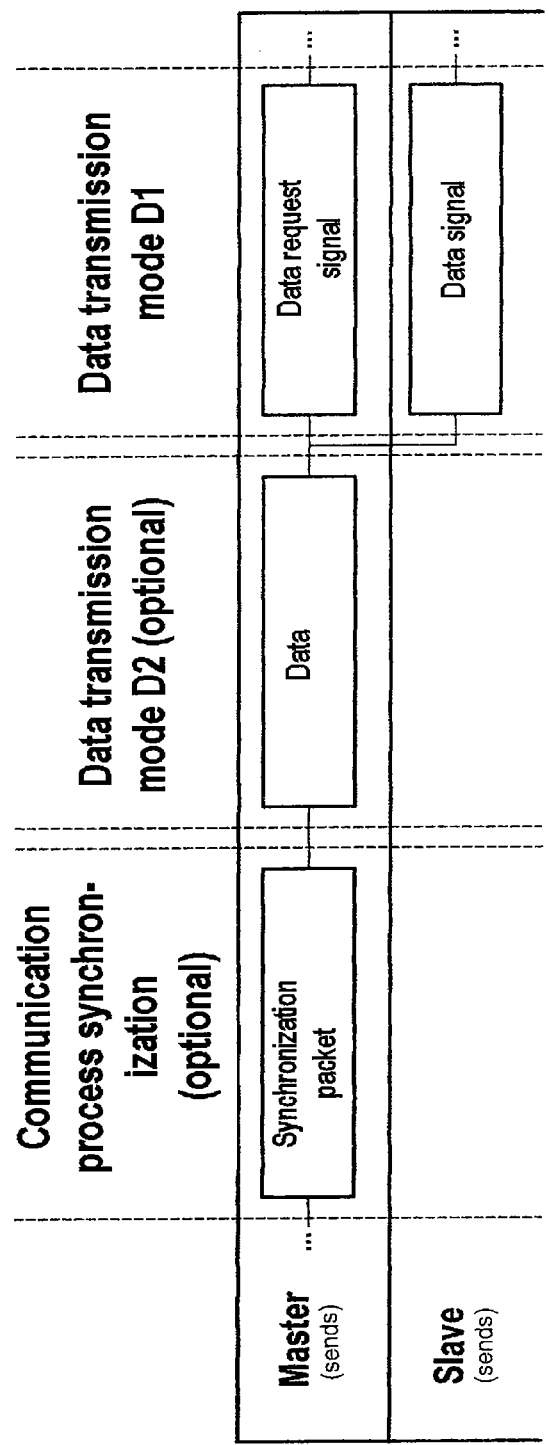
FIG. 10 shows the bases for the data transmission protocol.

FIG. 10 illustrates the main feature of the data transmission protocol by way of example. In a first data transmission mode D1, a slave unit responds with a respective data signal to a data request signal from the master unit. In a second data transmission mode D2, only the master unit sends data or data signals, which are respectively embedded in a clock signal. The synchronization at the start of a new communication process is performed by means of the transmission of a synchronization packet by the master unit.

Figure 11:
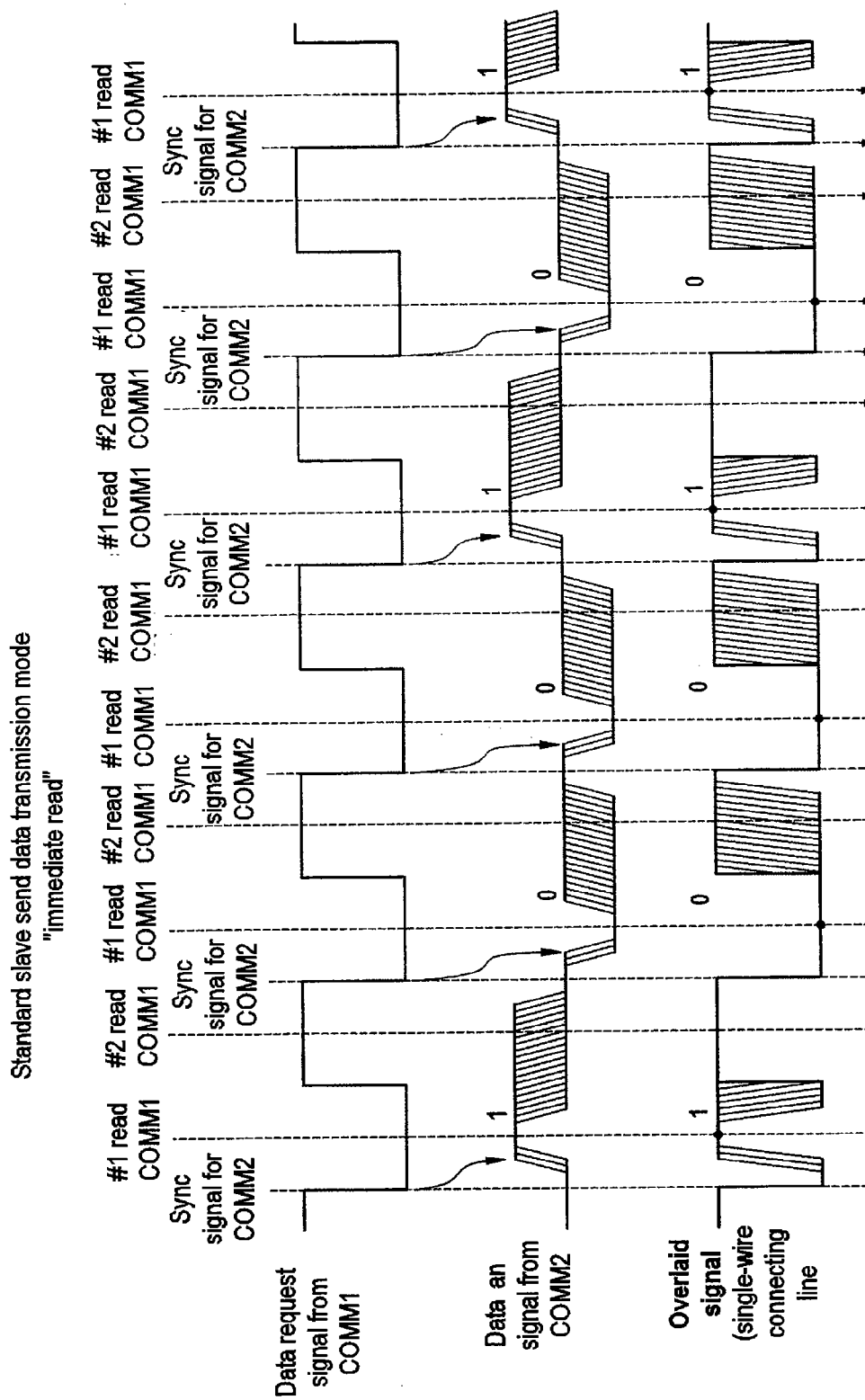
FIGS. 11 to 13 show three alternative, exemplary forms of the first data transmission mode.
Figure 12:
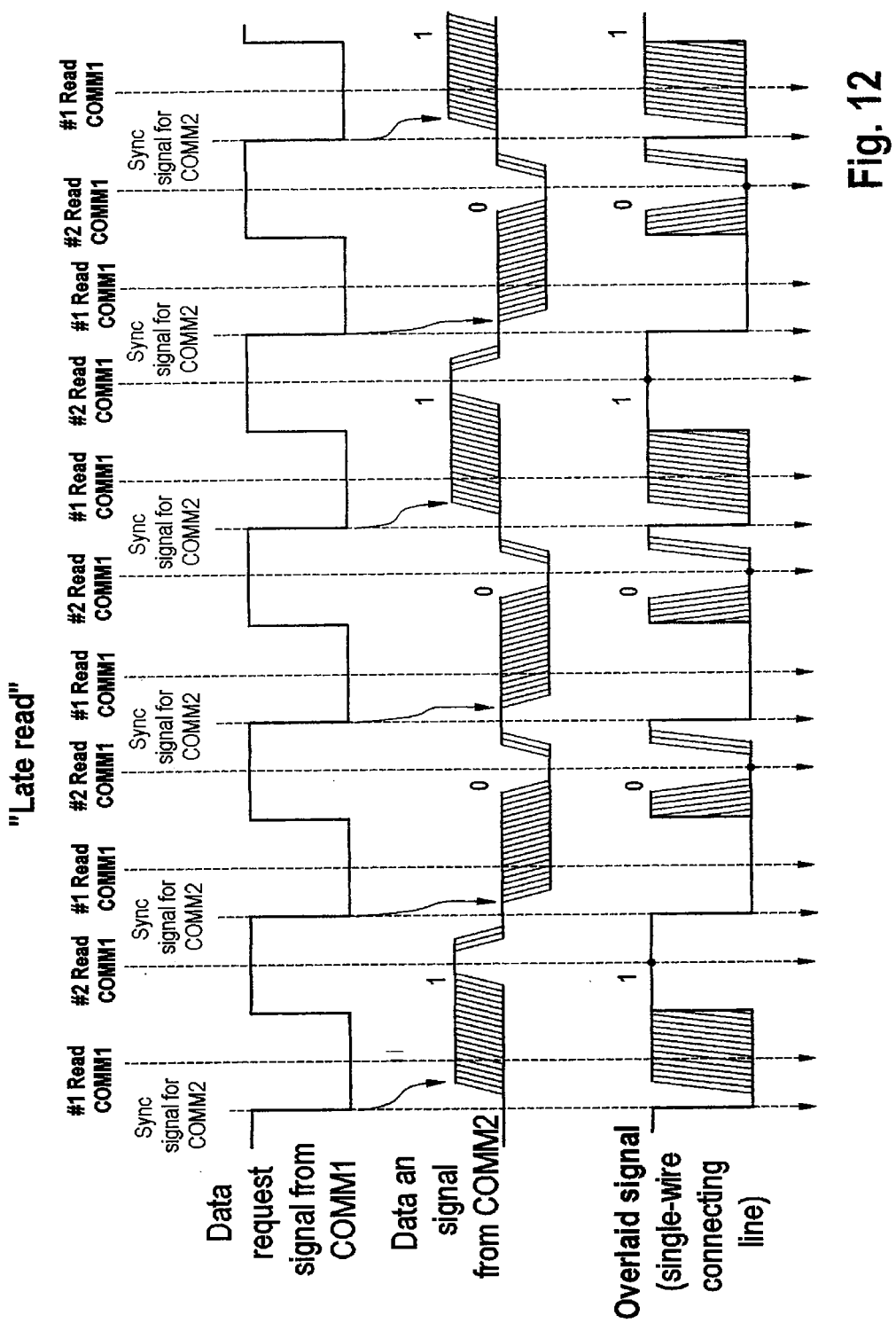
Figure 13:
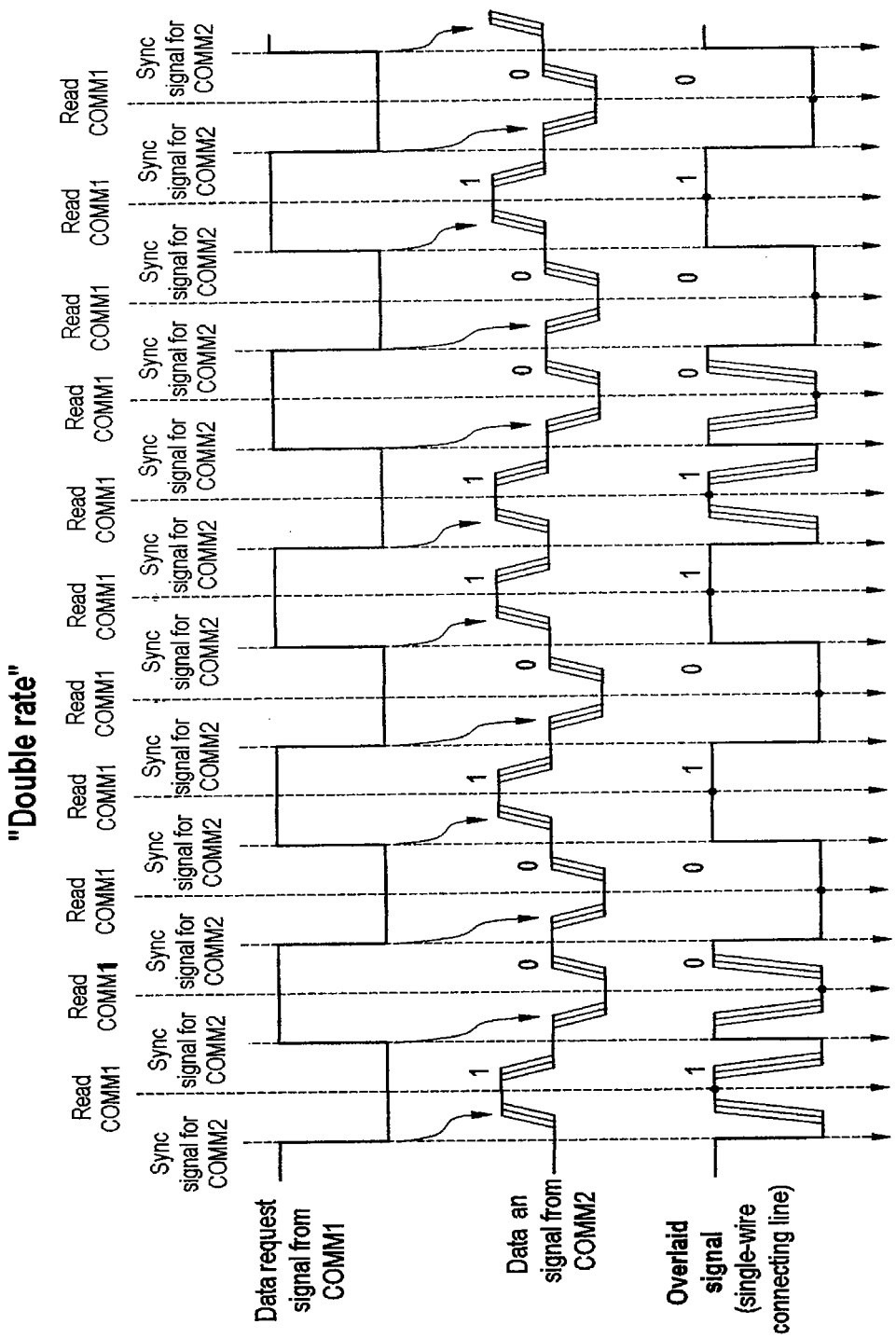

FIGS. 11 to 13 are used to illustrate various forms of the first data transmission mode or slave send data transmission mode between the second communication unit Comm2 or first slave unit and the first communication unit Comm1 or the master unit.

In the case of the standard slave send data transmission mode in FIG. 11, each data element of the slave unit Comm2 is synchronized either by rising or falling edges of the data request signal or synchronization signal. In the standard "serial peripheral interface" module of the master unit, this means that two respective read cycles involve only one data information item being transmitted. A filter which is provided in or upstream of the master "Serial-Peripheral-Interface" module or the master unit can be used to filter out the data of the additional read pulse following transmission. As a result, the internal program cycle dispenses with the need to filter out the useful data from the data stream which has been read. In this context, FIG. 11 shows an "Immediate Read" form of the first data transmission mode, with synchronization to the falling edge of the data request signal or sync signal, in which the useful data are read in directly after the data request signal.

FIG. 12 shows a "Late read" form of the first data transmission mode, with synchronization to the falling edge of the data request signal or the sync signal, in which the useful data are not read in until shortly before the next sync signal. It is therefore possible for the useful data to be allowed to settle for longer in order to achieve more stable signal levels.

FIG. 13 shows a "Double Rate" form of the first data transmission mode, in which the useful data from Comm2 are requested both by the falling edge and by the rising edge of the Comm1 sync signal. In this context, in contrast to the two forms shown in FIGS. 11 and 12, a higher data transmission rate for a lower "serial peripheral interface" depth of data is possible, since each read cycle involves the transmission of a new useful data information item.

In further, alternative forms—not shown—, the synchronization for Comm2 is also possible upon every n-th data request signal edge or sync signal edge or else under level control. In addition, every m-th read cycle is also conceivable for reading in the useful data.

FIGS. 14a) to c) show exemplary forms of the communication system with a first communication unit or master unit 1 and a second communication unit or first slave unit 2, which are connected to one another by means of a first data line 3, OSPI.

Wired-AND Communication (FIG. 14a); Wired-OR Communication (FIG. 14b):

The master unit 1 and the slave unit 2 are directly connected to the first data line 3, but the output stages 6, 7 or low side driver 6 activate(s) only the "Low" level (wired-AND communication) or the high side driver 7 activates the "High" level (wired-OR communication). Hence, significantly higher signal levels can be used for the communication in comparison with the implementation with resistor coupling. With the design of the pull up 8 and pull down 9 resistors (and of the driver transistors), such an interface can be optimized to a significantly greater extent in terms of the requirements of the application, for example in terms of the transmission rate and EMC, by setting the edge gradient for the signal transmission.

An alternative exemplary embodiment shown in FIG. 14c) is communication via an interface, in which the electrical signals from the first communication unit or master unit 1 are applied as a voltage and the electrical signals from the second communication unit or first slave unit 2 are applied as a current to the power supply of the slave unit via the first data line 3 and also an additional line—not shown. This allows joint use of the first data line as a supply line and data transmission line/clock line. For this purpose, the slave unit 2 comprises a voltage regulation unit 10 and a current source unit 11 for applying the data signal to the first data line 3. In line with the example, the master unit 1 comprises a high side driver 7 and a voltage regulation unit 12 with an integrated current measuring unit which comprises a comparator unit.

FIG. 15 shows the block diagram of an exemplary converter OSPI converter for the implementation of a slave unit in the electronic communication system. The figure shows a converter which, at the slave unit end, for the previously described transmission principles of the single data line transmission, converts the interface signals of other secondary interfaces, e.g. "serial peripheral interface", I2C, memory interfaces, for transmission via the first data line as sole data line.

In this context, the basic functions—which are required for the data transmission mode X (slave send data transmission mode or master send data transmission mode)—of the bit-by-bit transmission of the data signals from the slave unit or the slave data stream with synchronization to the data request signal from the master unit, including the timing control of the output driver, are provided by a send logic block (transmission control logic).

A functional unit (edge detection)—illustrated here optionally—undertakes the recognition of valid edges of the OSPI signal, including the implementation of possible filter functions.

If the optional second data transmission mode Y (master sends data and "clock") is implemented, a functional unit (receive control logic) is needed which decodes the data sent by the master from the OSPI signal profile.

The measures required for the optional implementation for the recognition of a synchronization packet are implemented by a further functional unit (frame sync detection).

The functions which are dependent on the protocol definition, including the actuation of the secondary interface(s), are implemented in a "superordinate" unit (protocol control logic).

The invention claimed is:

1. An electronic communication system, comprising:
at least one first communication unit and one second communication unit which are connected to one another by a first data line, the first data line being a single wire,
wherein the communication system has a data transmission protocol according to which, in a first data transmission mode for synchronous data transmission, the first communication unit transmits a data request signal or a clock signal to the second communication unit via the first data line at least once and the second communication unit transmits a data signal to the first communication unit via the first data line in response to the data request signal or the clock signal, the data signal and the clock signal being transmitted simultaneously on the first data line such that the data signal and the clock signal overlap each other in time to electrically combine to produce a combined signal.

2. The communication system of claim 1, wherein the data transmission protocol is in a form such that the data signal from the second communication unit comprises a defined number of bits for the first data transmission mode.

3. The communication system of claim 2, wherein the data signal from the second communication unit comprises one bit.

4. The communication system of claim 1, wherein the data transmission protocol is in a form for the first data transmission mode such that a message from the second communication unit to the first communication unit comprises a plurality of data signals.

5. The communication system of claim 4, where the message comprises at least one defined, separately interpretable information item.

6. The communication system of claim 1, wherein the first communication unit and at least the second communication unit are connected to one another by means of an additional ground line and/or by means of an additional power supply line.

7. The communication system of claim 1, wherein the data transmission protocol is in a form at least for the first data transmission mode such that the data signal as output signal from the second communication unit and the clock signal or the data request signal from the first communication unit on the first data line are overlaid or that the data signal from the second communication unit overdrives the clock signal or the data request signal from the first communication unit on the first data line, wherein the data signal determines the signal value on the first data line.

8. The communication system of claim 1, wherein at least the second communication unit does not have a clock generator unit of its own or it has a clock generator unit which does not operate in sync with a clock generator unit of the first communication unit.

9. The communication system of claim 1, wherein the second communication unit is in a form such that its response time for the data request signal or the clock signal from the first communication unit is within a defined time interval which is smaller than the period duration or a multiple of the period duration of the clock signal from the first communication unit and/or of the clock from the clock generator unit of the first communication unit.

10. The communication system of claim 1, wherein the communication system is in the form of a modified serial peripheral interface communication system with a reduced number of lines.

11. The communication system of claim 10, wherein the communication system is in the form of a modified serial peripheral interface communication system with one information transmission line, wherein at least the first communication unit and/or the second communication unit essentially comply with a serial peripheral interface standard.

12. The communication system of claim 10, wherein the first communication unit has two data connections, of which one data connection is operated as a data input and one data connection is operated as a data output, wherein the data connections are operated in sync with one another.

13. The communication system of claim 1, wherein the data transmission protocol is in a form such that the first communication unit in a second data transmission mode transmits a data signal and a data request signal or clock signal essentially simultaneously and/or the clock signal embedded in the data signal and/or a common data clock signal at least to the second communication unit via the first data line.

14. The communication system of claim 1, wherein the data transmission protocol is in a form such that a respective, defined communication process comprises the transmission of a synchronization packet and/or of an identification packet and/or of a command packet and/or of an address packet from the first communication unit to at least the second communication unit via the first data line.

15. The communication system of claim 1, wherein the first communication unit and/or the second communication unit have a push-pull stage with a high side driver and a low side driver or have a high side driver with an optional pull down resistor or a low side driver with an optional pull up resistor.

16. The communication system of claim 1, wherein the first and at least the second communication unit and also the data transmission protocol are in a form such that the data signal and/or the data request signal or the clock signal are transmitted using defined current and/or voltage values or by means of optical data transmission on the first data line.

17. The communication system of claim 16, wherein the data signal and/or the data request signal or the clock signal are encoded by means of a defined signal form, comprising at least one defined signal edge and/or at least one signal pulse and/or at least one signal pulse pause.

18. The communication system of claim 1, wherein the first communication unit is in the form of a master unit and the second communication unit is in the form of a slave unit and the data transmission protocol is in a form such that the first data transmission mode is designed as a slave send data transmission mode and/or the second data transmission mode is designed as a master send data transmission mode.

19. The communication system of claim 1, wherein the first communication unit is connected to at least the second communication unit by means of a two-wire interface which is used to transmit information, wherein the information is transmitted in current-encoded form, unidirectionally or bidirectionally, and at least the second communication unit is supplied with electrical power via said two-wire interface.

20. The communication system of claim 1, wherein at least the second communication unit is in a form such that it can receive and independently interpret an identification packet and/or a command packet and/or an address packet and/or an ending packet from the first communication unit.

21. The communication system of claim 16, wherein at least the second communication unit is in a form such that it interprets the identification packet for a selection from at least two defined access methods and, on the basis of this interpretation, independently puts itself into a defined mode of operation and/or transmits a defined response to the first communication unit and/or independently prompts and executes an internal activity, wherein said internal activity comprises the storage of a defined data item or of a plurality of defined data items at one or more defined memory addresses.

22. The communication system as claimed in claim 1, wherein the second communication unit is integrated in a sensor and/or actuator unit.

23. A method for data transmission between at least one first communication unit and at least one second communication unit of a communication system which are connected to one another by a first data line, the first data line being a single wire, the method comprising:
transmitting a data request signal or a clock signal from the first communication unit to the second communication unit via the first data line at least once; and
transmitting a data signal from the second communication unit to the first communication unit via the first data line in response to the data request signal or the clock signal, the data signal and the clock signal being transmitted simultaneously on the first data line such that the data signal and the clock signal electrically combine to produce a combined signal.

24. The method of claim 23, wherein the data signal from the second communication unit comprises a defined number of bits for the transmission mode.

25. The method of claim 24, wherein the data signal from the second communication unit comprises one bit for the first data transmission mode.

26. The method of claim 23, wherein at least for the at least one first data transmission mode the clock signal from the first communication unit and the data signal from the second communication unit are transmitted essentially simultaneously via the first data line.

27. The method of claim 23, wherein the second communication unit sends the data signal in response to the data request signal or the clock signal from the first communication unit within a defined time interval which is smaller than the period duration or a multiple of the period duration of the clock signal from the first communication unit and/or of the clock from a clock generator unit of the first communication unit.

28. The method of claim 23, wherein the first communication unit in a second data transmission mode transmits a data signal and a data request signal/clock signal essentially simultaneously and/or the clock signal embedded in the data signal and/or a common data clock signal at least to the second communication unit via the first data line.

29. The method of claim 23, wherein the first communication unit transmits a synchronization packet at least to the second communication unit via the first data line at the beginning of a defined communication process with at least the second communication unit.

30. The method of claim 29, wherein the defined communication process is self-contained.

31. The method of claim 23, wherein in a defined communication process a synchronization packet and/or an identification packet and/or a command packet and/or an address packet is transmitted from the first communication unit to at least the second communication unit via the first data line.

32. The method of claim 29, further comprising transmitting a message in a defined communication process from the first communication unit to the second communication unit in accordance with the second data transmission mode and/or transmitting a message from the second communication unit to the first communication unit, in accordance with the first data transmission mode, via the first data line.

33. The method of claim 29, wherein the synchronization packet comprises an identifiable starting block signal which has a starting pulse pause (L) of defined length and a starting pulse (H) of defined length and/or has a starting pulse/starting pulse pause signal, wherein the duration ratio (L:H) of the starting pulse to the starting pulse pause has a defined magnitude and/or which has an explicitly identifiable sequence of starting pulses and starting pulse pauses with a respectively defined duration.

34. The method of claim 33, further comprising ascertaining a clock reference variable from the explicitly identifiable starting block signal with at least the second communication unit and using the clock reference variable to customize its own defined data request signal/clock signal response signal time interval.

35. The method of claim 31, wherein the identification packet comprises an information item for selecting from at least two defined access methods which the second communication unit interprets and subsequently puts itself into a defined mode of operation and/or according to which the second communication unit transmits a defined response to the first communication unit and/or independently prompts and executes an internal activity, wherein the internal activity comprises the storage of a defined data item or of a plurality of defined data items at one or more defined memory addresses.

36. The use of the communication system as claimed in claim 1 in motor vehicles.

* * * * *